Figure 1:
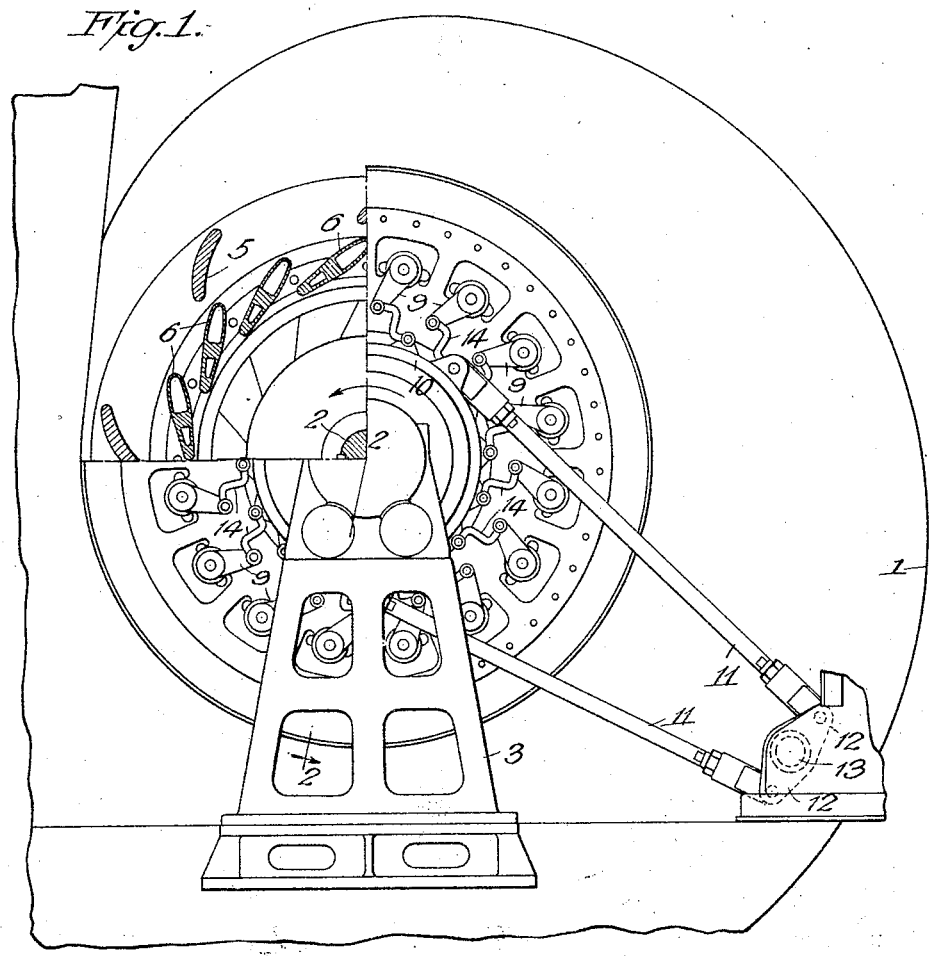

June 23, 1925.  
F. R. BENSON  
BREAKAGE LINK  
Filed Feb. 21, 1924  
1,543,050

INVENTOR.  
FRANK R. BENSON  
BY Sheffield & Betts  
His ATTORNEYS

Patented June 23, 1925.

1,543,050

UNITED STATES PATENT OFFICE.

FRANK R. BENSON, OF KECOUGHTAN, VIRGINIA, ASSIGNOR TO NEWPORT NEWS SHIPBUILDING & DRY DOCK COMPANY, OF NEWPORT NEWS, VIRGINIA, A CORPORATION OF VIRGINIA.

BREAKAGE LINK.

Application filed February 21, 1924. Serial No. 694,269.

*To all whom it may concern:*

Be it known that I, FRANK ROBERT BENSON, a citizen of the United States, residing at Kecoughtan, county of Elizabeth City, State of Virginia, have invented certain new and useful Improvements in Breakage Links, of which the following is a full, clear, concise, and exact description.

This invention relates to a breakage link or connection between two relatively movable members and has for its object the provision of an improved device of this character which is efficient and reliable in operation, of simple construction and readily manufactured. More particularly, my invention has reference to a breakage link or connection for the gate regulating mechanism in hydraulic turbines and the like. In apparatus of this character, a plurality of wicket gates is employed for controlling the flow of water to the water wheel, which gates are generally arranged concentrically with respect to said wheel. The gates are all operated simultaneously by means of a shifting ring member located concentrically with respect to the gates. The gates are connected to said operating member by a connecting link. Provision must be made to permit the remainder of the gates to close in the event the closing of one or more of the gates is prevented by an obstruction.

It is an object of my invention to provide such a connecting link, which is the weakest member of the gate regulating mechanism, and designed to elongate or break when the strain or moments of force exceed a given value, thereby leaving the other members of the turbine gate free to operate without being blocked by the clogged parts.

Such links are designed to elongate or break under excessive strains caused by the aforesaid abnormal pressure of foreign obstructions, but are capable of carrying any load imposed upon it to operate the gates under normal conditions.

Another object of my invention is to provide a connecting or breakage link of the character described which will break under a bending stress rather than by a direct stress; that is, the tensile stress between the operating parts causes angular moments of force in accordance with the abnormal pressures to act upon an intermediate angular portion of the link in opposite directions to produce a leverage which will bend the link up to or beyond the breaking point.

A further object of my invention is to provide a breakage link so designed that when broken, the broken parts will clear each other and the gate to which said link was connected will be entirely free.

A still further object of my invention is to provide a breakage link having the aforesaid characteristics which may be made of uniform cross-section, and of cheap or easily formed material which will have definite rupturing or bending characteristics, so that each link may act under substantially the same abnormal forces, and therefore break under substantially the same abnormal conditions.

Safety links having the above mentioned characteristics have a special utility in connection with the control of hydraulic turbines because of the fact that they will give slightly owing to their resiliency should an obstruction which is not sufficient to cause a rupture of the link, be encountered in operating a gate. The fact that the obstruction might be effective only for a small fraction of a second, or because the pressure applied thereto might cause it to be dislodged, may obviate interrupting the operation of the turbine. A further advantage of this type of safety link is that it permits of the same being correctly designed so that by the use of a standard composition of metal, the exact point at which the link will be ruptured may be determined within very close limits and, therefore, the user and manufacturer is enabled to keep in stock links of definite dimensions which may be relied upon to have various breaking points and definite moduli of elasticity. It will be appreciated that should the obstruction be only sufficient to cause a slight bending of the angular portions of the link, the operation of the particular gate which it controls may be continued and the link replaced by a normal one at the convenience of the attendant in charge.

My invention will be better understood from the following description taken in connection with the accompanying drawings and its scope will be pointed out in the appended claims.

Figure 2:
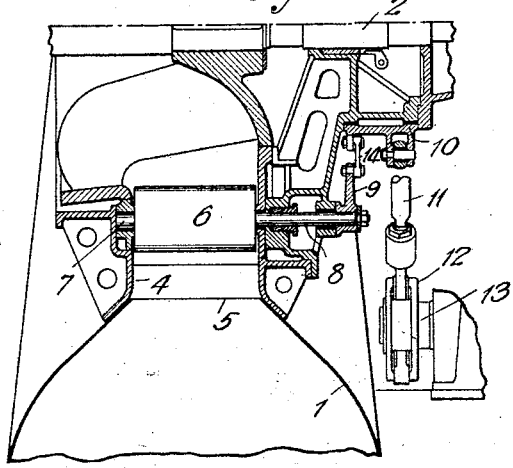
Figure 3:
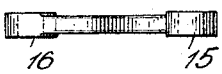
Figure 4:
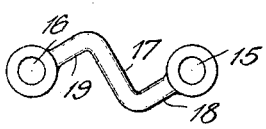

In the drawings, Fig. 1 is a side elevation of a turbine with parts in section and parts broken away, embodying my invention, Fig. 2 is a sectional view taken on the line 2—2 of Fig. 1, the standard being omitted, Fig. 3 is an enlarged side view of my breakage link, and Fig. 4 is a plan view of Fig. 3.

Referring to the drawings, the numeral 1 indicates a spiral casing, 2 the turbine shaft, 3 one of the standards for supporting said shaft, 4 the speed ring, and 5 supporting ribs. Within the speed ring 4 is located a plurality of wicket gates 6, each having a short stem 7 at one end suitably journaled in a bearing, and a long stem 8 at its opposite end which is also journaled in suitable bearings and extends through said speed ring to the exterior of the turbine. Secured to each of the stems 8 is an operating arm 9. The turbine is also provided with an actuating or shift ring 10, which is operated by means of links 11, secured to arms 12 on shaft 13. The parts thus far described are well known in the art and require no further explanation. The stems 8 are each connected with the shift ring 10 by a breakage link 14 which constitutes my invention. This link may be made of any suitable metal having the desired rupturing and bending characteristics. As shown in Figs. 3 and 4, the link 14 is provided at each of its ends with an eye 15, 16, whereby it may be bolted or otherwise secured to the shift ring 10 and arm 9 respectively. The portion of the link intermediate said eyes is so formed as to exert a leverage at definite points thereon when under load, the middle portion 17 being offset with respect to its end portions 18, 19. In the preferred form, the end portions 18, 19 are parallel, the inner ends thereof being united by the middle portion 17 at an angle thereto, the link assuming a zig-zag or Z-shape. The angle of the middle portion may of course be varied as the needs require and the end portion need not necessarily be parallel. As shown in the drawings, the body of the link 14 comprising the parts 17, 18, 19 is made of uniform cross-section, and formed of one piece of metal. They may therefore be readily duplicated and easily manufactured, but of greater importance, each link will act under substantially the same abnormal forces and therefore break under the same abnormal conditions. It is of course understood that the link 14 is made so as to have a lower breaking and bending point than any other part of the wicket gate operating mechanism. It will also be observed that when the link breaks, the broken parts will tend to clear each other, leaving the particular gate entirely free. While a turbine of the horizontal shaft type is shown, the invention is equally adapted for the vertical shaft type, and for many other uses.

From a consideration of the above description, taken in connection with the drawings, the operation of my improved breakage link will be apparent without further explanation and the advantages set forth prior to the detailed description will readily be recognized. I do not wish to be understood as being limited to the details of form or arrangement of parts herein set forth as various changes may be made by those skilled in the art without departing from the spirit or scope of my invention which is set forth in the annexed claims.

What I claim is:

1. In an hydraulic turbine, in combination with the gate and the gate operating mechanism, a protecting member intermediate said parts, comprising a connecting link having a middle portion comprising offset portions in angular relation to each other and adapted to bend relatively when said link is subject to opposing forces acting thereon which exceed a predetermined value.

2. In an hydraulic turbine, a gate, a crank arm on said gate and a gate operating mechanism in combination with a movable member operated by said mechanism and a link connecting said crank arm and said member, the middle portion of said link comprising integral parts in angular relation to each other and adapted to break by bending action when the opposing forces acting thereon exceed a predetermined value.

3. In an hydraulic turbine, a combination comprising a wicket gate having a crank arm, a shift ring, and a breakage link connecting said parts, said link having a middle portion comprising integral parts in angular relation to each other, whereby an excessive load applied thereon between said arm and ring will subject said angular parts to bending stresses as distinguished from direct tensile or compressive stresses.

4. In an hydraulic turbine, a gate, a crank arm on said gate and a gate operating mechanism comprising a movable member in combination with a link of uniform cross-section connecting said crank arm and said member and having an offset middle portion adapted to break through a bending movement when the opposing forces acting thereon exceed a given value.

Signed

FRANK R. BENSON.